United States Patent [19]

Becker et al.

[11] Patent Number: 5,420,205

[45] Date of Patent: May 30, 1995

[54] BINDER AND COATING AGENT COMPOSITION, ITS MANUFACTURE AND USE

[75] Inventors: Heinz D. Becker, Bonn; Klaus Bederke, Sprockhövel; Gerhard Bremer, Frechen; Herrmann Kerber, Wuppertal; Birgit Precht, Köln; Fritz Sadowski, Brauweiler; Werner Stephan, Wuppertal, all of Germany

[73] Assignee: Herberts Gesellschaft mis beschrankter Haftung, Wuppertal, Germany

[21] Appl. No.: 262,584

[22] Filed: Jun. 20, 1994

[30] Foreign Application Priority Data

Jun. 29, 1993 [DE] Germany .......... 43 21 533.5

[51] Int. Cl.$^6$ .................................. C08G 79/02
[52] U.S. Cl. ........................ 525/168; 528/297; 528/303; 528/306; 525/437; 525/445; 524/81; 524/401; 523/500
[58] Field of Search ............ 528/297, 303, 306; 525/168, 437, 445; 524/81, 401; 522/6, 104, 106; 523/500

[56] References Cited

U.S. PATENT DOCUMENTS

| | | | |
|---|---|---|---|
| 4,049,634 | 9/1977 | Ko et al. | 528/296 |
| 4,424,314 | 1/1984 | Barzynski et al. | 525/454 |
| 4,745,141 | 5/1988 | Akiyama et al. | 523/500 |
| 4,975,300 | 12/1990 | Deviny | 427/54.1 |

*Primary Examiner*—Samuel A. Acquah
*Attorney, Agent, or Firm*—Schweitzer Cornman & Gross

[57] ABSTRACT

A binder composition suitable for coating agents is described, that contains one or more unsaturated polyesters with an acid number of 5–60 mg KOH/g, a hydroxyl number of 50–200 mg KOH/g and a weight-average molecular weight (Mw) of 500–3000 g/mol, that are obtainable by reaction of A) one or more alpha,beta-ethylenically unsaturated dicarboxylic acids or their anhydrides,
B) one or more hydroxy-functional allyl ethers and
C) one or more ethylenically unsaturated compounds with an oxirane group in the molecule, in the molar ratio of A):B):C)=(2 to 4):(2 to 4):(0.5 to 1.8). The composition is suitable in particular for filling putties and filling compounds that dry rapidly, even at low temperatures.

7 Claims, No Drawings

BINDER AND COATING AGENT COMPOSITION, ITS MANUFACTURE AND USE

The invention relates to a binder composition that is suitable in particular for the production of coating agents, curing by radical action and drying oxidatively, especially for filling putties and filling compounds for the repair of damaged car body parts and in the series lacquering of cars. The binder composition is based on unsaturated polyesters, which can be formulated with reactive diluents to coating agents.

EP-A-0 154 924 describes unsaturated polyester resins consisting of condensed units of alpha,beta-ethylenically unsaturated dicarboxylic acids or their anhydrides, optionally other dicarboxylic acids or their anhydrides, aliphatic diols and trimethylolpropane diallyl ether. These polyester resins can be formulated together with styrene to coating agents. In recent years, however, styrene has proved to be toxic: efforts are being made to prepare styrene-free coating agents. Within the framework of the present invention it has become evident that the replacement of styrene in these known coating agents by other reactive diluents does not lead to coating agents that satisfy the requirements of a tack-free cure in a short time.

DE-A-39 38 149 describes binders for coating materials of fatty acid esters, e.g. oils and maleic anhydride, which are reacted in a substituting Diels-Alder reaction. According to that, hydroxy-functional vinylically or allylically unsaturated compounds add to the anhydride group; in addition, the reaction product can be reacted with a glycidyl ester of an unsaturated fatty acid. Practical experience has shown, however, that this procedure leads to a gelation and usable coating agents are not obtained.

It was the object of the present invention to provide binders for radical-curing and oxidatively drying coating agents that produce rapid drying, even in thick layers and even at room temperature (about 23° C.), good abradability and good pigment wetting with good processing, although they can be formulated free from styrene. Such binder compositions should be suitable in particular for the manufacture of filling putties and filling compounds.

It has become evident that this object can be achieved by the use of unsaturated polyester resins based on alpha,beta-ethylenically unsaturated dicarboxylic acids or their anhydrides, hydroxy-functional allyl ethers and alpha,beta-ethylenically unsaturated compounds with an oxirane group in the molecule.

The invention therefore provides binder compositions that are suitable for coating agents and contain one or more ethylenically unsaturated polyesters that are obtainable by condensation and addition of
  A) one or more alpha,beta-ethylenically unsaturated dicarboxylic acids or their anhydrides,
  B) one or more hydroxy-functional allyl ethers and
  C) one or more ethylenically unsaturated compounds with an oxirane group in the molecule,
wherein the condensation takes place in the molar ratio of A):B):C)=(2 to 4):(2 to 4):(0.5 to 1.8).

The binder compositions can be free from solvents, but they can also optionally contain one or more organic solvents. The binder compositions are preferably liquid at room temperature, e.g. at 23° C.

The ethylenically unsaturated polyesters included in the binder compositions according to the invention have an acid number of 5-60 mg KOH/g, a hydroxyl number of 50-200 mg KOH/g and a weight-average molecular weight (Mw) of 500 to 3000 g/mol, e.g. measured by gel permeation chromatography (polystyrene standard). They contain 0.8 to 1.2 ethylenic double bonds per 100 g of the polyester.

In the manufacture of the unsaturated polyester, maleic acid, maleic anhydride, fumaric acid, itaconic acid, citraconic acid and/or mesaconic acid, for example, can be used as component A. Maleic anhydride is preferably used.

As component B, diols and/or polyols partially etherified with allyl alcohol for example are used. As diols and polyols, straight-chain or branched aliphatic di- and polyols, for example, come into consideration. These are preferably definite monomeric compounds. The polyols contain e.g. 3 to 6, preferably 3 to 5, OH groups. Examples of component B) are trimethylolethane monoallyl ether, trimethylolethane diallyl ether, trimethylolpropane monoallyl ether, trimethylolpropane diallyl ether, pentaerythritol monoallyl ether, pentaerythritol diallyl ether, pentaerythritol triallyl ether and glycerol monoallyl ether. Preferably trimethylolpropane monoallyl ether and trimethylolpropane diallyl ether are used. For the preparation of the polyesters no other polyols are added.

There can be used for example as component C) glycidyl esters of unsaturated acids, e.g. glycidyl esters of unsaturated monocarboxylic acids, such as e.g. glycidyl acrylate, glycidyl methacrylate, undecenoic acid glycidyl ester and dimethylacrylic acid glycidyl ester, as well as glycidyl esters of unsaturated monocarboxylic acids or monoglycidyl esters of unsaturated dicarboxylic acids, such as e.g. maleic acid monoalkyl glycidyl esters, itaconic acid monoalkyl glycidyl esters, citraconic acid monoalkyl glycidyl esters and mesaconic acid monoalkyl glycidyl esters. Other examples are reaction products from diepoxides and ethylenically unsaturated monocarboxylic acids or dicarboxylic acid monoalkyl esters, e.g. reaction products from diepoxides and (meth)acrylic acid in the molar ratio of 1:1; further examples are allyl glycidyl ether and vinyl glycidyl ether. Defined monomeric compounds, in particular, are used. Preferably glycidyl methacrylate is used.

The unsaturated polyesters to be used according to the invention can be produced by known methods, e.g. by melt esterification or azeotropic esterification of the alcohols and acids or of their esterifiable derivatives. Examples of such methods are described in "Methoden der organischen Chemie" (Houben-Weyl), 4th Edition, Volume 14/2, Georg Thieme Verlag, Stuttgart 1961, pages 1–5, 21–33 and 40–44.

Suitably, according to a preferred embodiment, the unsaturated polyester to be used according to the invention is produced in two stages.

In this case a condensation, preferably a melt condensation of components A) and B), takes place in the first stage. The condensation can suitably occur by the azeotropic process, with use of customary entrainers in the course of this the water of reaction is continuously removed.

As entrainers, aromatic and aliphatic hydrocarbons for example are suitable, such as e.g. xylene, toluene, cyclohexane or heptane. The distillation can be operated for example at temperatures of 100°–180° C., preferably at 120°–150° C. The condensation is preferably continued to an acid number of 80–120, most preferably 110 mg KOH/g.

In a second stage in the preferred embodiment, component C) is then introduced by addition. The addition can occur at elevated temperature, e.g. of 70°–130° C., preferably of 80° to 110° C. For this purpose catalysts, such as e.g. triphenyl phosphite, are suitably used. The addition occurs at the residual carboxyl groups still remaining from the first process stage.

The binder compositions according to the invention can be formulated in particular to coating agents, curing by the action of radicals and drying oxidatively, which for their part form an object of the invention. For this purpose the unsaturated polyesters on which the binder compositions are based are used with one or more reactive diluents, that are preferably free from styrene and styrene derivatives. Particular suitable reactive diluents are for example ethylenically unsaturated monomers, in particular those that can react with the unsaturated polyester under drying or curing conditions (e.g. involving radicals). Examples of such reactive diluents are mono- or polyfunctional acrylates and methacrylates, such as diol diacrylates and triol triacrylates, and vinyl ethers. Specific examples are hydroxyethyl (meth)acrylate, hydroxypropyl (meth)acrylate, 1,4-butanediol di(meth)acrylate, 1,3-butanediol di(meth)acrylate, 1,6-hexanediol di(meth)acrylate, dipropyleneglycol di(meth)acrylate, ethylene glycol di(meth)acrylate, neopentyl glycol di(meth)acrylate, tetraethyleneglycol di(meth)acrylate, trimethylolpropane tri(meth)acrylate, pentaerylthritol tri(meth)acrylate, pentaerythritol tetra(meth)acrylate, dicyclopentenyloxyethyl (meth)acrylate, hydroxyethyl vinyl ether, hydroxybutyl vinyl ether, trimethylolpropane divinyl ether, tetraethylene glycol divinyl ether and cyclohexane divinyl ether.

The expression (meth)acrylic used here is intended to mean acrylic and/or methacrylic.

The aforementioned reactive diluents have the advantage of being non-toxic. It has become evident that the aforementioned reactive diluents can be formulated to rapid-hardening coating agents that require no addition of styrene or styrene derivatives.

The reactive diluents are added in such quantities that the desired application viscosity is reached. The proportion of reactive diluent is in general 8 to 135 pts. wt. (parts by weight) per 100 pts. wt. of the solids of the unsaturated polyester of the binder composition. It is an advantage of the present invention that low viscosities (suitable for application of the coating agents) can be achieved with low amounts of reactive diluents. The amounts added largely depend on the desired application.

If for example the coating agents formulated according to the invention have to be used as filling putties, advantageously 8 to 65, and preferably 8 to 45, pts. wt. of one or more reactive diluents are used per 100 pts. wt. of the unsaturated polyester. If it is intended to formulate the coating agents according to the invention as filling compounds (for example for multicoat lacquering), higher proportions of reactive diluent, for example 50 to 130 pts. wt., preferably 65 to 115 pts. wt., of reactive diluent, are preferably used per 100 pts. wt. unsaturated polyester. This results for example from the different methods of application. Whereas filling putties are in general highly viscous and are doctored on, it is advantageous to formulate filling compounds with lower viscosity, in order to be able to apply them by spraying.

For viscosity adjustment, one or more organic solvents may optionally be added to the coating agents according to the invention. Such solvents are for example the solvents customary in lacquer formulations, filling putties and filling compounds, such as esters, alcohols and ketones. Examples are ethyl acetate and butyl acetate, butanol and benzyl alcohol, as well as acetone (which can also serve as accelerator).

The solvents are generally used in amounts of not more than 5 wt %, relative to the finished coating agent, especially when filling putties and filling compounds have to be formulated. Water, however, can also be used as diluent. In this case it is preferred for the binder to have a high acid number, for example of 30 to 60, preferably of 30 to 50. They are preferably partly or completely neutralized with a base customary for coating agent purposes, such as ammonia or an amine.

For the manufacture of the coating agents, in particular filling putties, containing the unsaturated polyester resins to be used according to the invention, pigments and/or fillers are used. These materials are used for example in amounts of 30 to 80 wt. %, relative to the complete coating agents. Suitable organic and inorganic pigments for coating agents, such as iron oxide pigments and filling substances can be used. Examples of pigments preferably used in filling putties and filling compounds are inorganic pigments, such as iron oxide pigments and titanium oxide. Examples of fillers preferably used in such materials are in particular inorganic fillers, such as various kinds of talc, heavy spar, silicas, and magnesium aluminium silicates.

For the manufacture of the agents according to the invention, e.g. filling putties or filling compounds, all customary mixing units, such as dissolvers, planetary mixers, positive mixers and butterfly mixers can be used. The ingredients are mixed therein as desired.

The curing of the unsaturated polyester resins according to the invention in the coating agents occurs via a radical curing mechanism, for example by addition of initiators, such as peroxides, optionally in combination with customary accelerators, e.g. metal salts and optionally catalysts, which can also be copolymerized into the unsaturated polyesters according to the invention.

The customary radical initiators, for example, can be used as peroxides. Preferred peroxides are tert-butyl hydroperoxide, pinane hydroperoxide, cumene hydroperoxide, 2,5-dimethylhexane-2,5-dihydroperoxide, cyclohexanone hydroperoxide, methyl ethyl ketone hydroperoxide, 1-oxy-1'-hydroperoxydicylcohexyl peroxide and diisopropylbenzene monohydroperoxide. Most preferably the peroxides are added in amounts of 1 to 1.5 wt %, relative to the whole coating agent composition. The peroxides can also be added in stabilized form. An example of a customary stabilising agent is phthalate esters. If used in stabilized form, in general 2 to 3 wt % of the stabilized peroxide is generally used.

Accelerators customary for radical reactions can be used as accelerators, for example cobalt and manganese salts of acids—such as linseed oil fatty acids, tall oil fatty acids and soya fatty acids; or resin acids—such as abietic acids and naphthenic acids; or of acetic acids or isooctanoic acid. The accelerators are used in customary amounts, for example up to 1 wt %, e.g. 0.01 to 1 wt %, relative to the total weight of the coating agent.

The catalysts are customary catalysts for radical reactions. Compounds preferably used are aromatic amines such as N,N-dimethylaniline, N,N-diethylaniline, N,N-dimethyl-p-toluidine, oxyethylaniline, N,N-di-(2- hydroxyethyl)aniline, 4-dimethylaminobenzoic acid, 4-diethylaminobenzoic acid or CH-acid compounds, such as acetylacetone, acetoacetic ester and 5,5-dimethyldihydroresorcinol. The catalysts activate the decomposition with metal salts and thereby indirectly the activation of the peroxides. They can be used for example in amounts of 0 to 2 wt %, relative to the weight of the coating agent.

The catalyst can also be of such a nature that it contains both a CH acid and an alpha-beta-ethylenically unsaturated compound, such as acetylacetoxyethyl (meth)acrylate. It can then be incorporated into the unsaturated polyester.

Examples of customary auxiliary substances that can be added to the coating agents according to the invention are thixotroping agents, antisettling agents, degassing agents, levelling agents, adhesion resins and customary stabilizers. For stabilization of the unsaturated polyesters according to the invention, there can be added as auxiliary substances to the coating agents according to the invention customary polymerization inhibitors or antioxidants, e.g. hydroquinone, resorcinol, hydroquinone monomethylether, phenothiazine, p-tert-butylpyrocatechol, 2,6-di-tert-butyl-p-cresol and p-benzoquinone. The added amounts are e.g. about 10 to 1000 ppm, relative to the complete coating agent.

A preferred embodiment of the invention relates to coating agents that contain:

I. 20 to 60 wt. % of the mixture of binder composition and reactive diluent, wherein in the case of filling putties 25 to 35 wt % and in the case of filling compounds 45 to 55 wt % are preferred,
II. 30 to 80 wt % of one or more colouring pigments and/or fillers, 50 to 80 wt % being present in the case of filling putties and 30 to 50 wt % being present in the case of filling compounds,
III. 1 to 5 wt % of one or more initiators, e.g. peroxides,
IV. 0 to 1 wt % of one or more accelerators,
V. 0 to 2 wt % of one or more catalysts,
VI. 0 to 5 wt % of one or more organic solvents and
VII. optionally one or more customary paint additives.

The coating agents according to the invention are preferably prepared in such a way that they initially contain no peroxides. The peroxides are preferably added immediately before use. Activators, accelerators and catalysts can already be included in the coating agent compositions before the addition of the peroxide.

The coating agents according to the invention are suitable in particular as filling putties and filling compounds. Even at room temperature they produce rapid drying, even in thick layers, e.g. up to 1000 μm, good and rapid grindability, good pigment wetting for the uptake of colouring pigments and/or fillers, as well as a good processability.

The coating agents according to the invention can be applied in a customary way. This depends on the application or the viscosity of the material used. Thus materials of higher viscosity such as filling putties can be applied by spreading or doctoring. Materials of lower viscosity, such as filling compounds, can be applied by brushing but also by spraying.

The layer thicknesses can be very high: for example, in use as fillers they are of the order of magnitude up to 1000 μm and in use as filling putties of the order of magnitude up to 5000 μm.

The applied coating agent according to the invention can be cured oxidatively and by the radical mechanism. In general, radical initiators, so far as necessary and desirable, accelerators and catalysts, so far as each is necessary and desirable, are admixed, after which curing takes place in very short reaction times, for example of 5 to 10 minutes. Even at these short reaction times, curing can also be carried out at low temperatures of for example down to −5° C. or down to −10° C. In principle it is also possible to cure the coating agents according to the invention by actinic light, for example by UV light. For this purpose it is possible to add customary photoinitiators to the coating agents. In this case the addition of radical initiators can be dispensed with. The photoinitiators can be added for example in amounts of up to 5 wt %, for example of 1 to 5 wt %, relative to the coating agent.

The photoinitiators customary in the lacquer sector, for example, come into consideration as photoinitiators. Examples of photoinitiators are those that absorb for example in the wavelength range of 190 to 400 nm.

Azo initiators, for example, are suitable, e.g. azobis(isobutyronitrile). Other examples of photoinitiators are chlorine-containing initiators, such as chlorine-containing aromatic compounds, described e.g. in U.S. Pat. No. 4,089,815; aromatic ketones, as described in U.S. Pat. No. 4,318,791 or EP-A-003 002 and EP-A-0 161 463; hydroxyalkylphenones, as described in U.S. Pat. No. 4,347,111; phosphine oxides, as described in EP-A-0 007 086, 0 007 508 and 0 034 783; initiators based on hydroxyalkylphenones, as described in U.S. Pat. No. 4,602,097, unsaturated initiators, such as OH-functional aromatic compounds that have been esterified for example with acrylic acid, as described in U.S. Pat. No. 3,929,490, EP-A-0 143 201 and 0 341 560; or combinations of such initiators, as described for example in U.S. Pat. No. 4,017,652. Photoinitiators of the acrylophosphane oxide type and of the bis(acrylophosphane oxide) type, as described for example in EP-A-0 413 657, can also be used. They are especially suitable, optionally in combination with other photoinitiators, for example of the hydroxyalkylphenone type, for coloured coatings with transparent to opaque pigmentation. A preferred example of photoinitiators of the hydroxyalkylphenone type is 1-hydroxy-2-methyl-1-phenylpropan-2-one.

The coating agents according to the invention are applied for example as filling putties or filling compounds to a great variety of substrates, especially in the production of multicoat lacquer finishes. Usable substrates are for example metallic substrates or metallic substrates provided with one or more coatings. However, plastics substrates are also suitable for coating. The coating agents according to the invention are particularly suitable for repair and series lacquering, particularly of multicoat systems, e.g. in the motor vehicle sector.

The following examples serve to explain the invention. Unless otherwise indicated, the quoted parts and percentages relate to the weight.

TABLE 1

(Survey of the preparation of unsaturated polyesters):

| Raw Material | Component | Preparative Example 1 | 2 | 3 |
|---|---|---|---|---|
| Maleic anhydride | A | 2.81 | 3.01 | 3.10 |
| Trimethylolpropane monoallyl ether | B | 1.57 | 3.07 | 3.07 |

TABLE 1-continued (Survey of the preparation of unsaturated polyesters):

| Raw Material | Component | Preparative Example 1 | 2 | 3 |
|---|---|---|---|---|
| Trimethylolpropane diallyl ether | B | 1.28 | — | — |
| Glycidyl methacrylate | C | 1.25 | 1.32 | 1.27 |
| Acid number | | 15 | 15 | 50 |
| Hydroxyl number | | 65 | 152 | 140 |

PREPARATIVE EXAMPLE 1

In a 2-liter 3-necked flask, fitted with a stirrer, water separator and reflux condenser, 276.2 g (2.81 moles) of maleic anhydride, 273.2 g (1.57 moles) of trimethylolpropane monoallyl ether, 373.9 g (1.28 moles) of trimethylolpropane diallyl ether and 100 ppm of phenothiazine are heated to 90° C. under a gentle nitrogen stream. After 2 hours, 30 g heptane are added as an entrainer and azeotropic esterification is carried out at 150° to 170° C. until an acid number of 100 is reached. The entrainer is then removed in vacuo. After cooling to 90° C., 100 ppm of phenothiazine and 0.8 g of benzyltrimethylammonium chloride are added, and 180.3 g (1.27 moles) of glycidyl methacrylate are then fed in such a way that the temperature does not exceed 90° C. The unsaturated ester according to the invention is held at the temperature of 90° C. until an acid number of 15 is reached. The product obtained then has a viscosity of 3830 mPa.s.

PREPARATIVE EXAMPLE 2

In a 2-liter 3-necked flask, fitted with a stirrer, water separator and reflux condenser, 295.0 g (3.01 moles) of maleic anhydride, 534.2 g (3.07 moles) of trimethylolpropane monoallyl ether and 100 ppm of phenothiazine are heated to 90° C. under a gentle nitrogen stream. After 2 hours, 30 g heptane is added as entrainer and azeotropic esterification is carried out at 150° to 170° C. until an acid number of about 100 is reached. The entrainer is then removed in vacuo. After cooling to 90° C., 100 ppm phenothiazine and 0.8 g benzyltrimethylammonium chloride are added, and 187.4 g (1.32 moles) of glycidyl methacrylate are then fed in such a way that the temperature does not exceed 90° C. The unsaturated ester according to the invention is held at the temperature of 90° C. until an acid number of 15 is reached. The unsaturated polyester obtained in this way is adjusted with 10% dipropylene glycol diacrylate to a viscosity of 7990 mPa.s.

PREPARATIVE EXAMPLE 3

In a 2-liter 3-necked flask, fitted with a stirrer, water separator and reflux condenser, 303.8 g (3.10 moles) of maleic anhydride, 534.2 g (3.07 moles) of trimethylolpropane monoallyl ether and 100 ppm of phenothiazine are heated to 90° C. under a gentle nitrogen stream. After 2 hours, 30 g heptane agent is added and azeotropic esterification is carried out at a temperature of 150° to 170° C. until an acid number of about 100 is reached. The entrainer is then removed in vacuo. After cooling to 90° C., 100 ppm phenothiazine and 0.8 g benzyltrimethylammonium chloride are added, and 1.27 moles of glycidyl methacrylate are then fed in such a way that the temperature does not exceed 90° C. The unsaturated ester according to the invention is held at the temperature of 90° C. until an acid number of 50 is reached. 80% of the available carboxyl groups are subsequently neutralised with diethylamine, and the unsaturated polyester obtained in this way is adjusted with deionised water to a viscosity of ca. 4000 mPa.s.

COMPARATIVE EXPERIMENT

An unsaturated polyester according to Example 3 of EP-A-0 154 924 was prepared as follows:

Into a 2-liter 3-necked flask, fitted with a stirrer, water separator and reflux condenser there are weighed 2.70 moles of maleic anhydride, 0.30 moles of phthalic anhydride, 1.35 moles of 1,2-propanediol, 0.60 mole of diethylene glycol, 3.00 moles of trimethylolpropane diallyl ether and 0.2 g of p-benzoquinone, which are subjected under a nitrogen stream to a melt condensation until an acid number of 36.2 is reached. The polyester has a viscosity of 5700 mPa.s.

PREPARATIVE EXAMPLE 4

Preparation of a Filling Putty

Into a clean vessel there are weighed 30.2 parts of the polyester according to the invention of Example 2, 1.10 pts. wt. of a 1% hydroquinone solution in xylene and 0.6 pts. wt. of an organic thixotroping agent, and the mixture stirred with the dissolver (16 m/sec). 0.3 pts. wt. of pyrogenic silica are then added and the mixture stirred for a further 5 min. Then, with the dissolver running, 0.05 pts. wt. of yellow iron oxide, 3.0 pts. wt. of titanium dioxide, 26.4 pts. wt. of talc of a particle size of ca. 4 μm, 5.5 pts. wt. of heavy spar and 26.4 pts. wt. of talc of a particle size of ca. 1 μm are added. The temperature is raised to about 55°–60° C. by raising the stirring velocity to 18–21 m/sec. After a cooling-down phase to 40° C. 5.75 pts. wt. of dipropylene glycol diacrylate and 0.7 pts. wt. of a 10% solution of cobalt octanoate in ethyl acetate are stirred in by hand.

PREPARATIVE EXAMPLE 5

Preparation of a Filling Compound

Into a clean vessel, 30.2 pts. wt. of the polyester according to the invention of Preparative Example 2, 1.6 pts. wt. of a 1% solution of hydroquinone in xylene and 0.6 pts. wt. of an organic thixotroping agent and the mixture stirred with the dissolver (16 m/sec). 0.5 pts. wt. of pyrogenic silica are then added and the mixture stirred for a further 5 min. In addition, 18.5 pts. wt. dipropylene glycol diacrylate are weighed in. Then, with the dissolver running, 0.2 pts. wt. of yellow iron oxide, 0.2 pts. wt. of red iron oxide, 3.0 pts. wt. of titanium dioxide and 33.3 pts. wt. of talc of a particle size of ca. 4 μm are added. By raising the stirring velocity to 18–21 m/sec, the temperature is raised to about 55°–60° C. After a cooling-down phase to 40° C., 6 pts. wt. of dipropylene glycol diacrylate and 1.5 pts. wt. of a 10% solution of cobalt octanoate in ethyl acetate are stirred in by hand.

EVALUATIONS OF THE PROPERTIES

To the filling putties and filling compounds of Examples 4 and 5 there were added before the processing 3 wt % of methyl ethyl ketone peroxide (50% stabilized), and the mixture was stirred homogeneous and applied in a layer thickness of 20 to 800 μm for filling compounds and of 20 to 2000 μm for filling putties on ground sheet iron.

| | Examples according to the invention: | Comparative Example: |
|---|---|---|
| Filling compound | | |
| Pot life with 3% peroxide | 45 to 60 min. | 40 min. |
| Security against sag | 2 | 3–4 |
| Drying at 20° C. after 4 hours | 2 | 3 |
| Surface adhesive (after 4 hours) | 2 | 3 |
| Abradability after overnight drying (120 grade paper), loading of the abrasive paper | 1 | 2 |
| Recoatability with lacquering system, oven drying | in order | not in order |
| Moist/hot test according to DIN 50017 KK | 2 (in order) | 3 (not in order) |
| Filling Putty | | |
| Pot life with 3% peroxide | 10–15 min. | 6–10 min. |
| Drying at 20° C. after 2.5 hours | 2 | 2–3 |
| Surface adhesive (after 2.5 hours) | 2 | 3 |
| Abradability, drying by hand, 80 grade paper, loading of the abrasive paper | 1 | 2 |

Explanations on:
1) Security against sag:
   1=no sagging tendency
   2=small sagging tendency
   3=definite sagging tendency
   4=strong sagging tendency
2) Drying/surface adhesive
   1=tack-free
   2=slight adhesive
   3=definite adhesive
   4=strongly adherent
3) Abradability (loading of the abrasive paper)
   1=no loading
   2=loading Filling compounds and filling putties whose test results are rated with 3 or more are not suitable for practical use.

We claim:

1. Binder composition for coating agents, containing one or more unsaturated polyesters with an acid number of 5–60 mg KOH/g, a hydroxy number of 50–200 mg KOH/g and a weight-average molecular weight (Mw) of 500–3000 g/mol and a content of 0.8 to 1.2 ethylenic unsaturations per 100 g polyester, obtained by reaction of
   A) one or more alpha,beta-ethylenically unsaturated dicarboxylic acids or their anhydrides,
   B) one or more hydroxy-functional allyl ethers, without addition of other polyols, and
   C) one or more ethylenically unsaturated compounds with an oxirane group in the molecule,
in the molar ratio of A):B):C)=(2 to 4):(2 to 4):(0.5 to 1.8).

2. The composition of claim 1, further comprising 8 to 135 parts wt. per 100 parts wt. solids content of unsaturated polyester of one or more liquid ethylenically unsaturated monomers.

3. The composition of claim 2, further containing
   I. 20 to 60 wt. % of the mixture of binder composition and reactive diluent,
   II. 30 to 80 wt % of one or more colouring pigments and/or fillers,
   III. 1 to 5 wt % of one or more radical initiators
   IV. 0 to 1 wt % of one or more accelerators,
   V. 0 to 2 wt % of one or more catalysts,
   VI. 0 to 5 wt % of one or more organic solvents and
   VII. optionally one or more customary paint additives.

4. The composition of claim 2 as a filling putty further comprising 30 to 50 wt % of a pigment, or filler, or both pigment and filler.

5. Process for the manufacture of the binder composition according to claim 1, characterised in that in a first stage the components A) and B), defined in claim 1, are subjected to a condensation reaction and in a second stage the component C) defined in claim 1 is added.

6. Process according to claim 5, characterised in that the condensation of the components A) and B) is carried out with azeotropic removal of water in the melt.

7. The process of claim 5, further comprising mixing each 100 parts by weight solids of the product of claim 5 with 8 to 135 pts. wt. of a reactive diluent, and with one or more pigments or fillers, or both pigments and fillers, peroxides, accelerators, catalysts, solvents, and optionally laquer additives.

* * * * *